United States Patent Office 3,725,175
Patented Apr. 3, 1973

3,725,175
PROCESS FOR CURING POLYFERROCENYLENES
Norman Bilow, Los Angeles, Calif., and Harold Rosenberg, Dayton, Ohio, assignors to the United States of America as represented by the Secretary of the Air Force
No Drawing. Original application Mar. 6, 1969, Ser. No. 805,009, now Patent No. 3,640,963. Divided and this application Sept. 14, 1971, Ser. No. 180,528
Int. Cl. C09f 5/00
U.S. Cl. 156—327                     7 Claims

ABSTRACT OF THE DISCLOSURE

A method of curing low molecular weight polyferrocenylenes. Low molecular weight polyferrocenylenes are reacted with 1,1'-ferrocenedicarboxaldehyde or a substituted ferrocenedicarboxaldehyde in the presence of a suitable catalyst. This reaction produces a low molecular weight copolymer which, when subjected to heat and pressure, thermosets or cures to a hard, heat-resistant, radiation-resistant resin. The cured products of this invention are useful as resins in the formation of laminated structures.

This application is a division of our copending U.S. patent application Ser. No. 805,009, filed Mar. 6, 1969, now U.S. Pat. No. 3,640,963.

BACKGROUND OF THE INVENTION (1) Field of the invention

This invention is in the field of synthesis of resins which are thermosetting from resins which are thermoplastic.

(2) Description of the prior art

In the prior art, methods of synthesizing polyferrocenylenes have been described by various investigators. However, all of the polyferrocenylenes prepared thus far have been thermoplastic or infusible and intractable. Such thermoplastic resins do not cross-link and cure to hard, insoluble resins when subjected to heat and pressure. Thus, prior art polyferrocenylenes have failed to yield the full advantages potentially offered by the ferrocene moiety.

SUMMARY OF THE INVENTION

This invention involves the reaction of a low molecular weight polyferrocenylene, which is thermoplastic, with a curing agent to form a low molecular weight, thermosetting copolymer. The reaction may be carried out either in the presence of a solvent or in the absence of a solvent. Curing agents are 1,1'-ferrocenedicarboxaldehyde and derivatives thereof. Catalysts which are used as Lewis acids such as boron trifluoride, aluminum trichloride and zinc chloride.

The low molecular weight copolymers formed by the reaction are soluble in lacquer or varnish type solvents. The lacquers or varnishes formed by their solution can be applied as coatings to suitable reinforcing agents and the coated reinforcing agents subjected to heat and pressure to form laminated articles.

On the other hand, laminated articles may be formed by placing an intimate mixture of the reactants in a mold with suitable filler or reinforcing material and applying heat and pressure. In this manner the reaction is carried beyond the stage of low molecular weight, thermosetting copolymers to the final thermoset copolymer and thus the laminate, or filled resinous composition.

DESCRIPTION OF THE PREFERRED EMBODIMENTS

In practicing this invention one may react prior art thermoplastic polyferrocenylenes with a curing agent to produce new copolymers which are thermosetting. Some prior art polyferrocenylenes which may be reacted are:

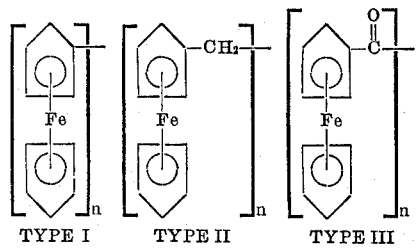

TYPE I    TYPE II    TYPE III

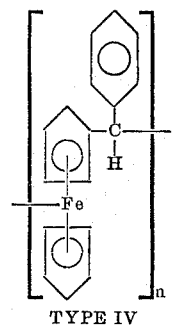

TYPE IV and

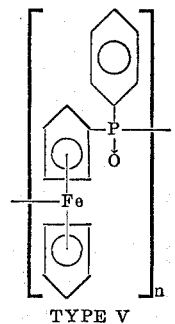

TYPE V wherein $n$ is an integer of from 2 to 10.

Some curing agents which are useful are exemplified below:

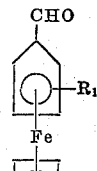
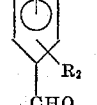
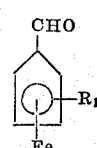
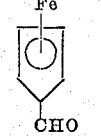

and

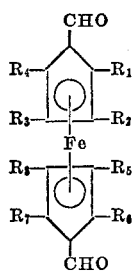

wherein $R_1$, $R_2$, $R_3$, $R_4$, $R_5$, $R_6$, $R_7$ and $R_8$ are groups such as hydrogen, methyl, ethyl, propyl, butyl, phenyl, phenoxy, methoxy, ethoxy, propoxy, methylphenyl, ethylphenyl, dimethylphenyl, chloro, bromo, fluoro, and other alkyl, aryl, alkoxy, aryloxy and alkaryl groups, and wherein those "R" groups adjacent to the CHO groups do not introduce excessive steric hindrance.

The polyferrocenylenes are reacted with the curing agents in the presence of a suitable catalyst. Boron trifluoride has been found to be an excellent catalyst. Other Lewis acids such as aluminum trichloride and zinc chloride have also been found useful. The reaction may be carried out at reflux temperatures in the presence of a solvent or at melt temperatures in the absence of a solvent. Solvents which have been found useful are methylene chloride, chloroform, tetrachloroethylene and carbon tetrachloride.

The reaction may also be carried out to completion or final curing by dissolving suitable amounts of the reactants and catalyst in one of the above-named solvents to form a lacquer and heating the lacquer. The lacquer thus prepared may be used to coat reinforcing materials and the coated materials heated under pressure to form laminated articles or the lacquer may be blended with a mineral filler, such as a clay or silica, or with an inert organic filler, and the lacquer then may be dried to provide a molding resin composition.

A typical reaction may be illustrated as follows:

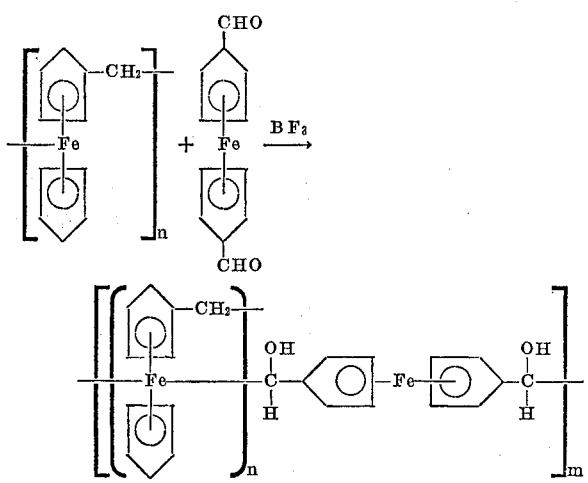

The letter $n$ in this equation designates an integer of from 2 to 10. The letter $m$ is an integer in the range of from about 2 to about 20. Molecular weights may be obtained by vapor phase osmometry. When the product of this reaction is subjected to heat and pressure, low molecular weight copolymer chains ($m=2-20$) will react with one another with the loss of water to form copolymers of extremely high molecular weight. In this reaction, hydroxyl groups may react with one another to lose water and form oxygen cross-links between molecules or react with CH groups to lose water and form methylene cross links. This cross-linking ability is what gives the copolymers the property of being thermosetting.

Some specific examples of reactions carried out are given below. It is to be recognized that the use of specific reactants in the examples does not limit the invention. Any of the prior art polyferrocenylenes (Type I through Type V) listed above could be reacted with any of the curing agents listed above in the manner disclosed by the examples to form thermosetting copolymers.

EXAMPLE I

Polyferrocenylene (9.0 grams, molecular weight 2130) of Type I above, 1,1'-ferrocenedicarboxaldehyde (3.0 grams), and boron trifluoride etherate (0.5 gram, 47% solution) were dissolved in methylene chloride. The lacquer thus formed was used to coat glass fabric and the coated fabric placed in a mold. A temperature of 400–600° F. and a pressure of 4000 p.s.i. was maintained on the coated fabric for about one hour. The reaction produced a laminated structure of very good quality.

EXAMPLE II

Polyferrocenylene (5.0 grams, molecular weight 700) of Type I above, 1,1'-ferrocenedicarboxaldehyde (2.5 grams), and boron trifluoride etherate (0.3 gram, 47% solution) were dissolved in methylene chloride. The solution was refluxed at 100° C. for 9 minutes. The lacquer formed by this reaction was used to coat glass fabric in the same manner as disclosed in Example I. The same temperature and pressure conditions (400–600° F. and 4000 p.s.i. for about one hour) again produced a very good laminate.

EXAMPLE III

Polyferrocenylene (20.0 grams, molecular weight 1290) of Type I above, 1,1'-ferrocenedicarboxaldehyde (8.5 grams), and boron trifluoride etherate (0.5 gram, 47% solution) were dissolved in methylene chloride. The lacquer thus formed was used to coat carbon cloth and the resulting coated structure placed in a mold. Temperature of from 400–600° F. and pressure of 4000 p.s.i. for about one hour again produced a laminate of very good quality.

EXAMPLE IV

Polyferrocenylene (12.6 grams, molecular weight 1290) of Type I above, 1,1'-ferrocenedicarboxaldehyde (3.5 grams) and boron trifluoride etherate (0.2 gram, 47% solution) were dissolved in methylene chloride. Glass fabric was coated with the lacquer thus formed and subjected to 400–600° F. and 1000 p.s.i. for about one hour to form a laminated structure.

EXAMPLE V

Polyferrocenylene (6.0 grams, molecular weight 4000) of Type I above, 1,1'-ferrocenedicarboxaldehyde (1.21 grams) and boron trifluoride etherate (0.2 gram, 47% solution )were slurried in methylene chloride (20 ml.). After stirring for 30 minutes, the solvent was removed by vacuum evaporation. The dried mixture was then placed in a mold with glass fabric and subjected to 400–600° F. temperature and 2000 p.s.i. pressure for about one hour. Again a very good laminate was produced.

Examination of the foregoing examples in relation to the above typical reaction will reveal that laminates may be obtained in three ways. (1) The reactants may be mixed in a lacquer type solvent, the lacquer used to coat reinforcing material and the reaction brought to its conclusion by heat and pressure. In this case $m$ is indeterminate because a hard, insoluble laminate is formed. (2) The reactants may be mixed in a solvent and the reaction carried to partial completion (Example II). The partially cured copolymer ($m=2-20$) which is still in the solvent may then be applied to a reinforcing material and the reaction or cure brought to its completion by the application of further heat and pressure. (3) The third way to obtain a laminate is discolsed in Example V. In this case the reactants are dissolved in a solvent and the solvent removed by evaporation. The intimately mixed, dried reactants are then used to form the laminate.

Temperatures ranging from 200–600° F., pressures ranging from 200–4000 p.s.i. and times ranging from 30 minutes to 2.5 hours may be used in the laminating process. The particular values may be easily ascertained by anyone skilled in the art. Solvents suitable for forming lacquers include chloroform, tetrachloroethylene, and carbon tetrachloride, as well as methylene chloride. Other reinforcing materials, well known in the art, such as quartz cloth or asbestos could be used in the laminated articles. The laminates are useful wherever high heat and radiation resistance or ablative protection or insulative protection is necessary. Furthermore, the composite dry powder in granular form provides a molding composition per se, in "A" stage polymerization, or in admixture with a conventional filler, or in the solvent or ground state serves as bonding agent for granular materials.

We claim:

1. The process of preparing a laminated article, said process comprising the steps of:
    (A) forming a lacquer by dissolving a polyferrocenylene selected from the group consisting of:

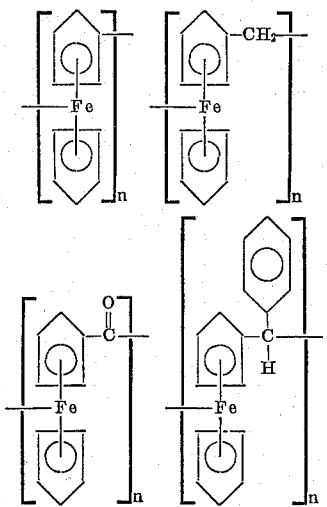

and

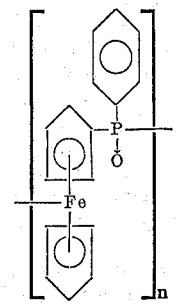

wherein $n$ is an integer of from 2 to 10; a curing agent selected from the group

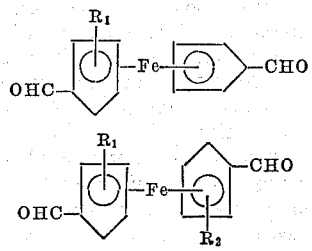

and

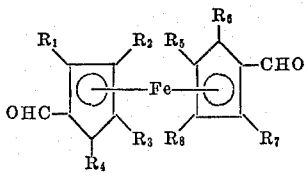

wherein $R_1$, $R_2$, $R_3$, $R_4$, $R_5$, $R_6$, $R_7$, and $R_8$ are selected from the group consisting of hydrogen, methyl, ethyl, propyl, butyl phenyl, phenoxy, methoxy, ethoxy, propoxy, methylphenyl, ethylphenyl, dimethylphenyl, chloro, bromo, and fluoro; and catalytic amounts of a catalyst selected from the group consisting of boron trifluoride etherate, aluminum trichloride and zinc chloride, in a solvent selected from the group consisting of methylene chloride, chloroform, tetrachloroethylene, and carbon tetrachloride;
    (B) applying said lacquer as a coat to a suitable reinforcing material to form a coated material; and
    (C) subjecting said coated material to heat and pressure until cured.

2. The laminated article formed by the process of claim 1 wherein the reinforcing material is glass fabric.

3. The laminated article formed by the process of claim 1 wherein the reinforcing material is carbon cloth.

4. The laminated article formed by the process of claim 1 wherein the reinforcing material is a combination of glass fabric and carbon cloth.

5. The laminated article formed by the process of claim 1 wherein the reinforcement is selected from the group consisting of cotton, wool, nylon cellulose acetate, polyacrylonitrile, polyamide, polyimide cloth, or mixtures thereof.

6. The process of preparing a molded article, said process comprising the steps of:
    (A) forming a lacquer by dissolving a polyferrocenylene selected from the group consisting of:

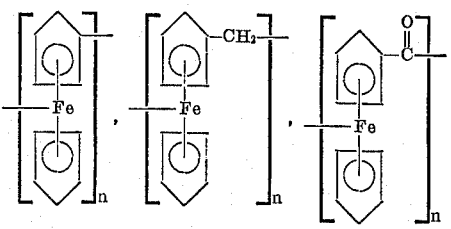

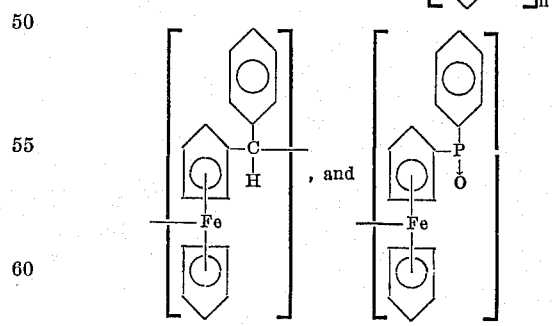

wherein $n$ is an integer of from 2 to 10; a curing agent selected from the group

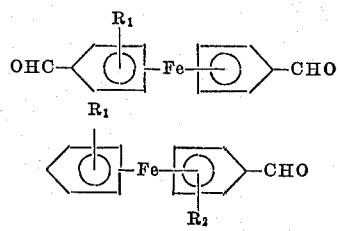

and

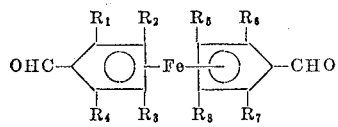

wherein $R_1$, $R_2$, $R_3$, $R_4$, $R_5$, $R_6$, $R_7$, and $R_8$ are selected from the group consisting of hydrogen, methyl, ethyl, propyl, butyl, phenyl, phenoxy, methoxy, ethoxy, propoxy, methylphenyl, ethylphenyl, dimethylphenyl, chloro, bromo, and fluoro; and catalytic amounts of a catalyst selected from the group consisting of boron trifluoride etherate, aluminum trichloride and zinc chloride, in a solvent selected from the group consisting of methylene chloride, chloroform, tetrachloroethylene, and carbon tetrachloride;

(B) blending said lacquer with a mineral filler, then drying said blended lacquer to provide a filled molding composition; and
(C) subjecting said filled molding powder to heat and pressure until cure is achieved.
7. The products produced by the process of claim 6.

References Cited
UNITED STATES PATENTS

| | | | |
|---|---|---|---|
| 3,503,821 | 3/1970 | Conklin | 156—327 X |
| 3,560,429 | 2/1971 | Bilow et al. | 117—126 GB |

EDWARD G. WHITBY, Primary Examiner

U.S. Cl. X.R.

117—126 GB, 143, 161 UA; 161—198; 260—37 R, 67 UA; 264—320